United States Patent Office 3,555,891
Patented Jan. 19, 1971

3,555,891
ULTRASONIC JET PROBES
Richard Lewis, Higham Ferrers, Ireland, assignor to
Stewarts and Lloyds Limited
Filed Aug. 11, 1967, Ser. No. 660,054
Claims priority, application Great Britain, Aug. 24, 1966,
38,063/66
Int. Cl. G01n 29/04
U.S. Cl. 73—71.5                                5 Claims

ABSTRACT OF THE DISCLOSURE

An ultrasonic jet probe which uses a jet of liquid which provides a path for ultrasound between an ultrasonic generator and an article under test has a main liquid passageway aligned with the generator and auxiliary liquid passages for discharging liquid adjacent the liquid discharged from the main passageway, the passageways being arranged so that the ultrasound is transmitted only along the main passage. Different arrangements for the passageways and a flexible sleeve extending the outlets of the passageways for forming a reservoir of liquid between the probe and the test article are described.

---

This invention is concerned with ultrasonic jet probes. An ultrasonic jet probe uses a jet of liquid for coupling an ultrasonic generator to an article to be tested, the jet providing a path for ultrasound between the generator and the article.

It is an object of the invention to provide an ultrasonic jet probe which is particularly suitable for use where the probe and the surface of an article being tested move at a high speed relative to another, although also capable of use for static testing.

According to the invention, an ultrasonic jet probe has a main irrigation channel aligned with an ultrasonic generator and extending therefrom to direct liquid onto an article under test, at least one passage for supplying liquid by way of the ultrasonic generator into the main irrigation channel, an auxiliary irrigation system for supplying liquid to at least one side of the stream of liquid from the main irrigation channel, and means for supplying liquid to the auxiliary irrigation system without contact with the ultrasonic generator.

In use of the probe where the probe and the surface of a test piece move at high speed relative to one another, the probe is arranged so that liquid from the auxiliary irrigation system is supplied to at least the leading side of the stream of liquid leaving the main irrigation channel, i.e., the side which faces in the opposite direction to the direction of movement of the adjacent test piece surface at high speed relative to the probe.

The invention further provides a method of ultrasonic testing using an ultrasonic jet probe which directs a jet of liquid on to the surface of an article to be tested, the probe and the surface of said article moving at a high speed relative to one another, in which method a main stream of liquid is directed by way of an ultrasonic generator on to the surface of said article and an auxiliary stream of liquid is supplied, without contacting said generator, to at least one side of the main stream before the main stream contacts the surface of said article.

The following is a description, by way of example, of an embodiment of the persent invention, reference being made ot the accompanying drawings, in which.

Figure 1:
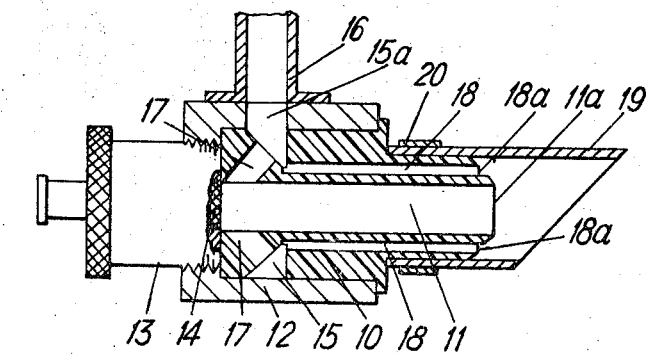
FIG. 1 shows an axial section through an ultrasonic jet probe.

The probe shown in FIG. 1 comprises a jet body 10 made of Teflon having a central axial through bore constituting main irrigation channel 11. The body 10 is held in a cylindrical housing 12 of aluminium alloy, into a tapped hole in which is screwed a cylindrical transducer holder 13 so as to position an ultrasonic generator comprising a flat piezoelectric transducer 14 at one end of the channel 11. The channel 11 has the same cross-sectional area as the transducer 14 and is aligned therewith.

The body 10 has an annular water supply channel 15 into which water can be fed through a water inlet hole 15a in the housing 12 from a water supply pipe 16 to a main water outlet opening 11a. Two diametrically-opposite inclined water supply passages 17 extend from the annular channel 15 into the channel 11 and directly towards the transducer 14. Five or six equally spaced channels 18 extending parallel to the channel 11 and forming an auxiliary irrigation system are disposed in the body 10 around the channel 11, these channels 18 opening directly from the annular channel 15 and extending to auxiliary water outlet openings 18a. It will therefore be seen that the channel 11 and the channels 18 derive their water supply from the annular water supply channel 15, but, while water flows into the channels 18 directly from the annular channel 15, water from the channel 11 flows rearwardly through the passages 17 on to the face of the transducer 14 and then forwardly along the channel 11. Feeding water on to the transducer face tends to minimise turbulence of flow at this point and ensures a good coupling at all operating speeds.

As can be seen from the drawing, the outlet 18a from the channels 18 are disposed slightly behind the outlet 11a from the channel 11. A flexible sleeve 19 is provided on the body 10 to surround the outlets 18a and 11a. The sleeve 19, which is a push fit on the body for easy replacement and is held in position by a clamp 20, protrudes (e.g. for a maximum distance of about ⅜ inch) beyond the outlet from the channel 11. The sleeve is made of flexible polyvinylchloride material. All water from the channels 11 and 18 enters the sleeve 19 to form a reservoir between the outlets 11a and 18a and an article being tested, this reservoir providing a path for the ultrasound to the article.

The probe may be used to test a longitudinally moving tube by rotating the probe rapidly round the outside of the tube. The probe as illustrated is intended to be mounted with its axis inclined at about 45° to a tangent to the tube, and therefore the free end of the sleeve 19 is inclined to the axis of the sleeve so that the whole edge of said free end can be disposed close to the surface of the tube being tested. Under normal operating conditions, the probe may rotate around the tube at surface speeds of up to 400 inches per second. The end of the sleeve 19 may for example be up to ⅛ inch from the tube surface.

The probe may be used with ultrasonic testing apparatus as described in U.K. patent specifications Nos. 1,038,-491 and 1,040,242 and the complete specification of U.K. patent applications Nos. 12,704/65 and 2,958/66.

The probe shown in FIG. 1 enables good acoustic coupling to be maintained when the probe is moving at high speeds relative to the test piece, and spurious ultrasonic reflections from the region of the water/test piece interface are minimised, the wanted signal being for this reason easier to identify. Consequently, the distance between the end of the probe and the test piece may be greater than would be possible with a plain jet. The probe can successfully ride over projections on the work-piece and, in consequence, the probe body is protected from physical contact and damage.

These advantages are obtained because the flow of water in the channels and passages of the jet body 10 described above enables high water velocities in the region of the transducer 14 to be avoided, thus eliminating or minimising turbulence adjacent to the transducer 14, because the dynamic lines of flow of the water leaving the end of the flexible sleeve are, owing to the interaction of the water from the channel 11 with that from the channels 18, such that a smooth flow of water is maintained which flow is sufficient to enable the end of the flexible sleeve to be up to 1/8 inch from the workpiece, whereby the ultrasonic noise level is minimised, and because the flexibility of the sleeve enables projections to be ridden over.

The probe can also be used for static application of ultrasound for both surface and shear wave testing.

Figure 2:
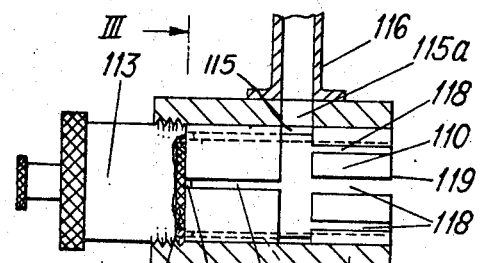
FIG. 2 shows an axial section through a different ultrasonic jet probe.
Figure 3:
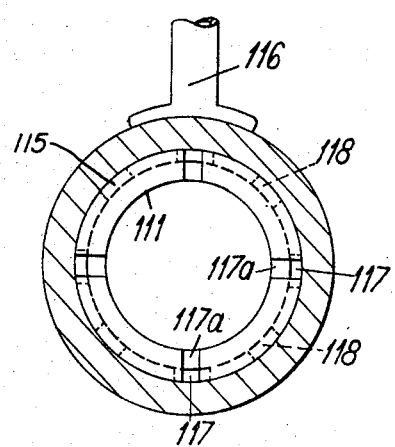
FIG. 3 shows a view taken in section along the line III—III of FIG. 2.

FIGS. 2 and 3 show a modified ultrasonic jet probe embodying the present invention. In this modified probe, a generally cylindrical jet body 110 has a central axial through bore forming a main irrigation channel 111. A housing 112 has a cylindrical recess which receives the jet body 110 and a transducer holder 113 is screwed into one end of the housing 112 and closes one end of the cylindrical recess. An ultrasonic generator in the form of a piezoelectric transducer 114 is mounted in the transducer holder 113 in alignment with the main irrigation channel 111.

The jet body 110 has on its periphery an annular slot forming an annular water supply channel 115 into which water can be supplied through a water inlet hole 115a in the housing 112 from a water supply pipe 116.

Water supply passages 117 are formed by four equally spaced slots in the periphery of the jet body 110 and extend longitudinally of the jet body 110 from the annular water supply channel 115 to radial slots 117a so that water can flow from the annular water supply channel 115 through the passages 117 and the slots 117a, by way of the transducer 114 into and along the main irrigation channel 111 to an outlet in the end face 119 of the jet body 110.

An auxiliary irrigation system is formed by eight equally spaced channels 118 provided as longitudinally extending slots in the periphery of the jet body 110 and extending from the annular water supply passage 117 to outlets on the forward end face 119 of the jet body 110.

Thus, the channels 118 and the channel 110 are supplied with water from the annular water supply channel 115 but, whereas some of the water flows through the channels 118 from the jet body 110 without contact with the transducer 114, the water which is supplied through the slots 117a into the channel 111 and thence from the jet body 110 flows over the transducer 114. Division of the water flow in this way reduces or even prevents air bubbles from reaching the face of the transducer 114 or the water flow which carries the ultrasonic beam between the transducer 114 and the article under test.

I claim:

1. An ultrasonic jet probe comprising a jet body having an axial bore therein defining a first jet outlet, a housing having said body mounted therein, said housing having an open end through which one end of said jet body and one end of said bore extend, an ultrasonic generator means mounted in the other end of said bore and in alignment therewith, means in said housing for fixing said ultrasonic generator means in said position, an annular channel formed between said housing and said jet body, liquid supply means comprising an inlet orifice in said housing connected to said annular channel, a plurality of angularly spaced first irrigation channels providing direct fluid connection between said annular channel and said bore and discharging immediately adjacent said ultrasonic generator means, a plurality of second jet outlets in said housing extending from said annular channel, parallel to said bore and angularly spaced about the axis of said bore in said body, whereby at least part of the liquid supplied to said probe is directed first against said ultrasonic generator means and then passes out through said first jet while the remainder of said liquid passes directly out of said second jet outlet means without contacting said ultrasonic generator thereby greatly reducing turbulence.

2. An ultrasonic jet probe as set forth in claim 1 wherein said second jet outlets are disposed rearwardly, relative to the direction of flow of the liquid in said first irrigation channels, of said first jet outlet.

3. An ultrasonic jet probe as set forth in claim 1 further comprising a sleeve surrounding said first and said second jet outlets and extending forwardly thereof, relative to the direction of flow of said liquid toward said jet outlets.

4. An ultrasonic jet probe comprising a nozzle, an elongated first irrigation channel extending through said nozzle, an ultrasonic generator mounted in one end of said first irrigation channel, a first nozzle outlet formed on the other end of said first irrigation channel for discharging a jet of liquid, means defining a liquid inlet in said nozzle, means defining a plurality of liquid outlet openings in said nozzle opening into said first irrigation channel immediately adjacent to and directed towards said ultrasonic generator, a plurality of liquid supply passages in said nozzle extending from said liquid inlet to said plurality of liquid outlet openings, a plurality of second nozzle outlets adapted to discharge liquid symmetrically around and immediately adjacent said jet of liquid, a plurality of second irrigation channels spaced around and parallel to said first irrigation channel and placing said liquid inlet in communication with said second nozzle outlets.

5. An ultrasonic jet probe as set forth in claim 4 further comprising a flexible sleeve extending forwardly, relative to the direction of flow of the liquid in said first and second irrigation channels, past said first and said second nozzle outlets.

References Cited

UNITED STATES PATENTS

| | | | |
|---|---|---|---|
| 2,751,783 | 6/1956 | Erdman | 73—67.8 |
| 3,218,846 | 11/1965 | Joy | 73—71.5 |
| 2,956,185 | 10/1960 | Von Stocker | 73—67.8X |
| 3,303,691 | 2/1967 | Beaujard et al. | 73—71.5 |

JAMES J. GILL, Primary Examiner